(12) United States Patent
Avery

(10) Patent No.: US 7,419,057 B2
(45) Date of Patent: Sep. 2, 2008

(54) SERVING CONTAINER COVER WITH ONE OR MORE SERVING UTENSIL RESTS

(76) Inventor: Jean E. Avery, P.O. Box 419, Spring Lake, NJ (US) 07762

( * ) Notice: Subject to any disclaimer, the term of this patent is extended or adjusted under 35 U.S.C. 154(b) by 325 days.

(21) Appl. No.: 11/057,883

(22) Filed: Feb. 15, 2005

(65) Prior Publication Data

US 2006/0180494 A1   Aug. 17, 2006

(51) Int. Cl.
  B65D 6/04   (2006.01)
  B65D 25/00   (2006.01)
  B65D 85/00   (2006.01)

(52) U.S. Cl. .................. 206/565; 220/212; 220/521; 220/735

(58) Field of Classification Search ......... 206/541–549, 206/459.5, 518, 557–565; 220/212, 521, 220/574–575, 735
See application file for complete search history.

(56) References Cited

U.S. PATENT DOCUMENTS

| | | | | |
|---|---|---|---|---|
| 2,436,097 A | * | 2/1948 | Clarke | ..................... 206/459.5 |
| 4,300,700 A | * | 11/1981 | Chang | ........................ 220/521 |
| D351,087 S | * | 10/1994 | Anderson | .................... D7/541 |
| 5,405,008 A | * | 4/1995 | Tanaka et al. | ............ 206/459.5 |
| 5,738,242 A | * | 4/1998 | Paris | .......................... 220/735 |
| 6,131,758 A | | 10/2000 | Callahan et al. | |
| 6,209,748 B1 | * | 4/2001 | Dunbar | ....................... 220/521 |
| 2003/0029868 A1 | * | 2/2003 | Davidov et al. | ............ 220/212 |
| 2006/0144841 A1 | * | 7/2006 | Sener | ......................... 220/521 |

* cited by examiner

*Primary Examiner*—Bryon P Gehman
(74) *Attorney, Agent, or Firm*—Hedman & Costigan, P.C.

(57) ABSTRACT

A serving container cover comprising one or more side walls, a top wall and an opening in the top wall. The serving container is preferably tapered, narrowing from the base portion to the top portion, so that the covers can be nested in a stacked arrangement. A rest is preferably incorporated into the serving container cover to support one or more serving utensils. The serving container cover also preferably includes a decorative graphic on at least a portion of the side walls and top wall.

14 Claims, 6 Drawing Sheets

SERVING CONTAINER COVER WITH ONE OR MORE SERVING UTENSIL RESTS

FIELD OF THE INVENTION

The present invention relates to decorative food service items. More particularly, the invention relates to a decorative cover for food serving pans, containers and the like.

BACKGROUND OF THE INVENTION

People have come to rely on the ease of disposable containers in serving food, as well as serving food in the cooking containers rather than transferring it to decorative serving containers.

For example, one container that is widely used for both cooking and serving food is the well known aluminum serving tray, often used by caterers and individuals preparing large portions. These trays are generally no more than a thick gauge aluminum with a polished aluminum exterior. They generally come in standard sizes, such as a full tray, generally being about 20 inches by 12 inches, or a half tray, generally being about 10 inches by 12 inches and about 3 inches high. They are also sometimes used with wire stands that are an additional 6 inches high.

As for cooking containers, these are often oven or stove safe containers, many of which are susceptible to staining by certain foods. They meet the utilitarian purpose of enduring the cooking environment and often have no real aesthetic quality.

In this regard, many of the serving trays and cooking containers in use today are not decoratively appealing. Efforts to improve the appearance of serving trays has been limited to merely coloring or printing a decorative pattern on the exterior of the tray or container itself. However, this provides a limited appeal.

SUMMARY OF THE INVENTION

The present invention is directed to a serving container cover comprising one or more side walls, a top wall and an opening in the top wall. Preferably, the cover includes one or more rests for supporting serving utensils.

In the preferred embodiment, the serving container cover will have a larger base portion and a smaller top portion, so that the serving container covers can be stacked. This configuration will permit storage space to be minimized for multiple serving container covers.

The serving tray cover can be formed of any suitable material, including porcelain, earthenware, ceramics, laminated glass, metal, paper, cardboard, polymers, plastics or the like. Most preferred are polymers and plastic for lower costs, ease of manufacture, durability and disposability.

When using polymers or plastics, the serving container cover can be formed in a variety of ways, including foaming, injection molding, vacuum forming, etc. When a disposable polymer or plastic material is used, vacuum forming is a suitable method of production.

It is also preferred that the serving container cover of the present invention include a decorative graphic, such as a decorative color, design and/or wording, to enhance the aesthetic appeal.

The length and width of the serving tray cover need only fit over the serving container being covered. Preferably, there would be a minimum of space between the serving container and the outer edge of the serving container cover, including the rest when used, to minimize wasted space on a serving table. The opening in the top of the serving container cover is of sufficient size to conceal the edge of the serving container but not so small as to impair access to the edges of the serving container. As such, the dimensions of the serving container cover are not of particular significance to the invention.

Similarly, the height of the serving container cover is not of particular significance to the invention, wherein it should only be high enough to cover a serving container. Alternative embodiments are contemplated with different heights so that one cover can fit over a serving container placed directly on a surface while another cover will fit over a serving container placed over a serving tray on a stand, as commonly used in catering. Alternatively, the serving container cover can come in two parts, with a lower part to be used when the serving container is placed on a stand.

BRIEF DESCRIPTION OF THE DRAWINGS

The drawings which are a part of the present application are intended to illustrate the present invention, without limiting the invention in any manner whatsoever, wherein.

DETAILED DESCRIPTION OF THE PREFERRED EMBODIMENT

Figure 1:
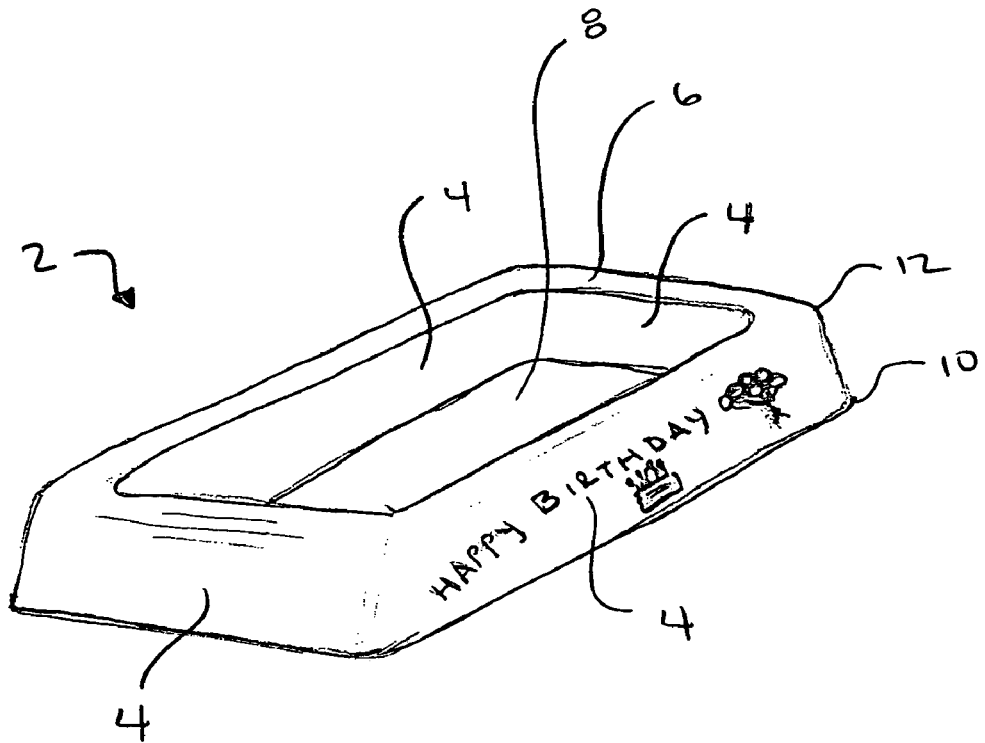
FIG. 1 is a perspective view of a serving container cover of the present invention.
Figure 2:
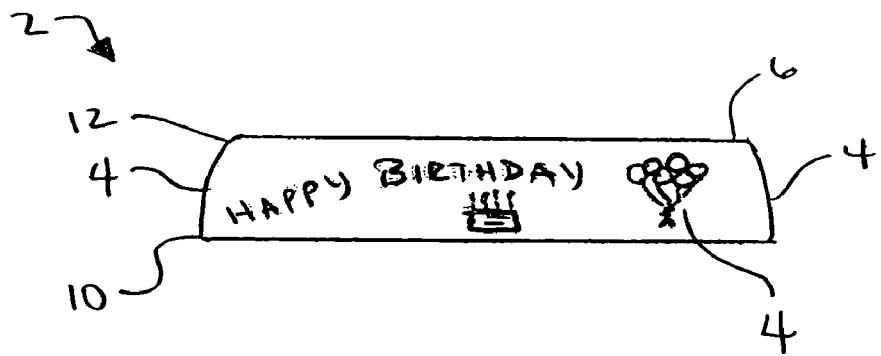
FIG. 2 is a side elevation view of the serving container cover of FIG. 1.
Figure 3:
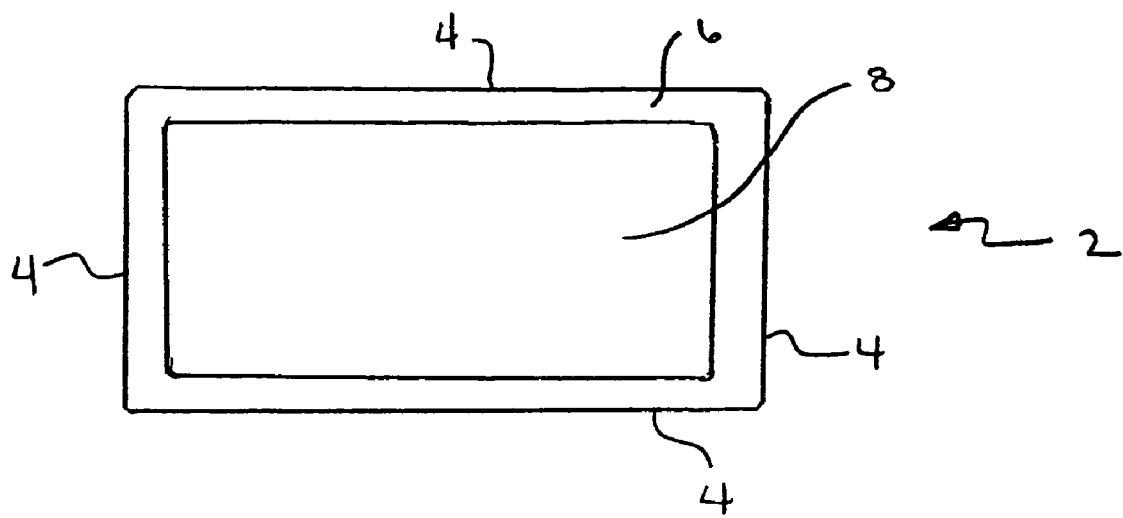
FIG. 3 is a plan view of the serving container cover of FIG. 1.
Figure 4:
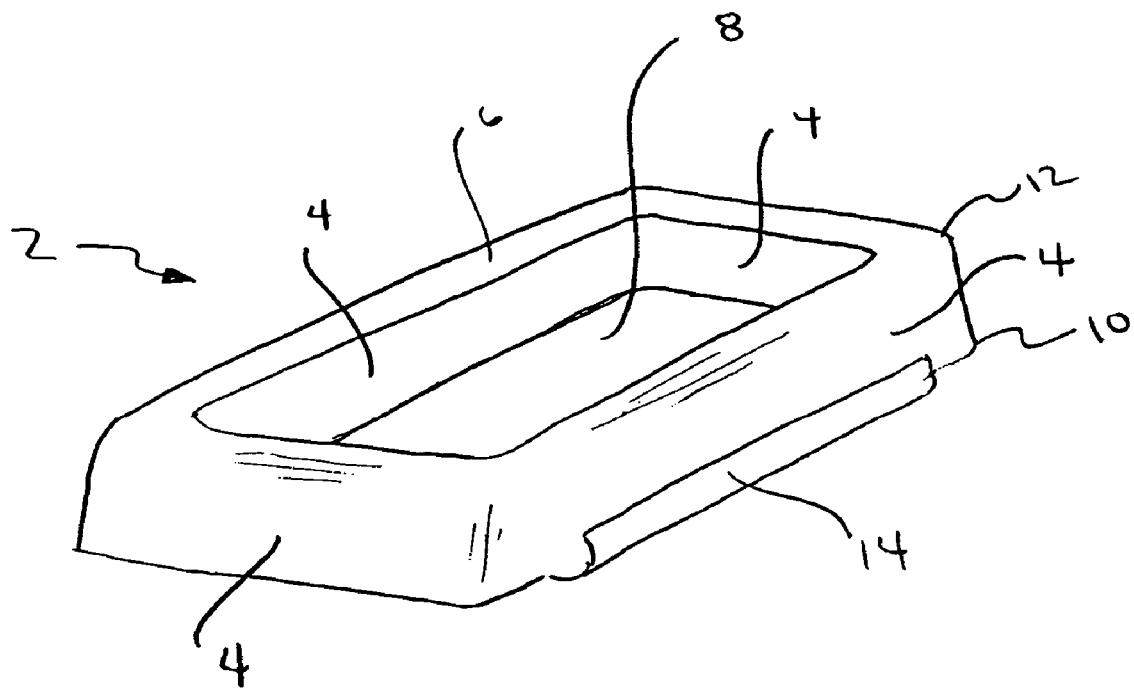
FIG. 4 is a perspective view of an alternative embodiment of the serving container cover of the present invention, having a rest on a side wall for supporting one or more serving utensils.
Figure 5:
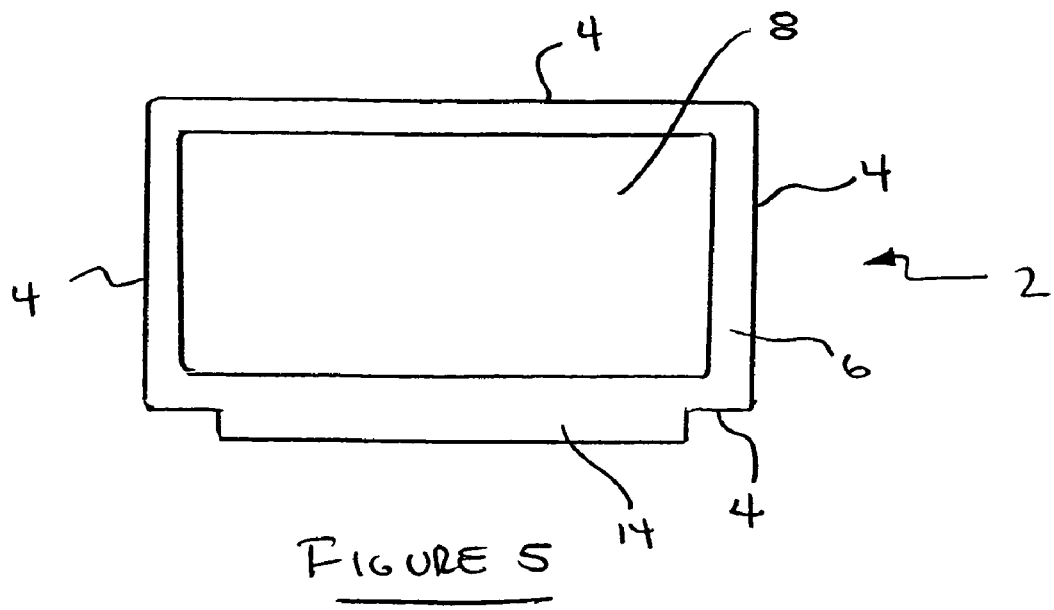
FIG. 5 is a plan view of the serving container cover of FIG. 4.
Figure 6:
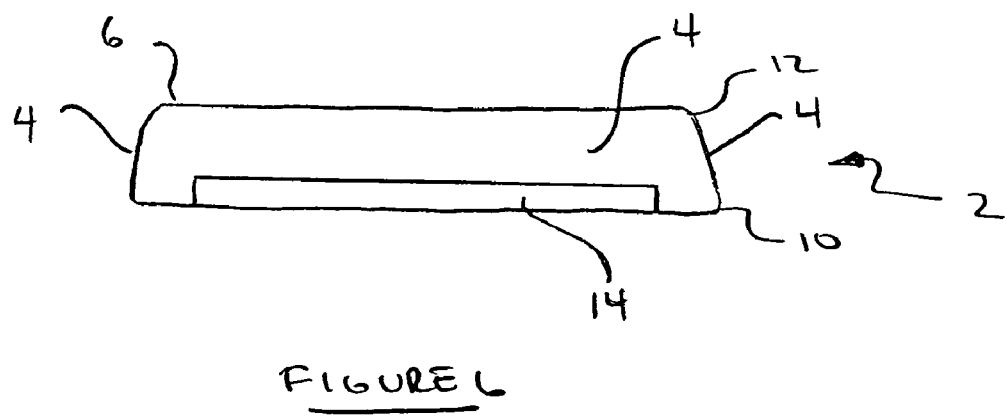
FIG. 6 is a front elevation view of the serving container cover of FIG. 4.
Figure 7:
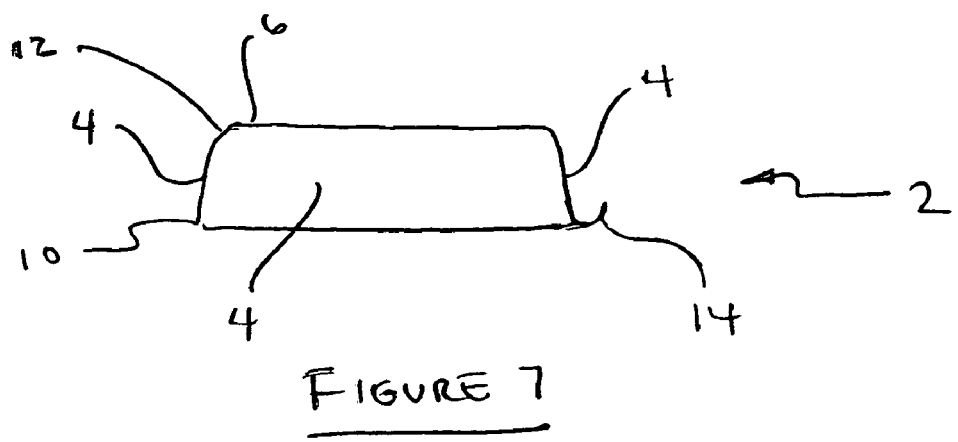
FIG. 7 is a side elevation of the serving container cover of FIG. 4.
Figure 8:
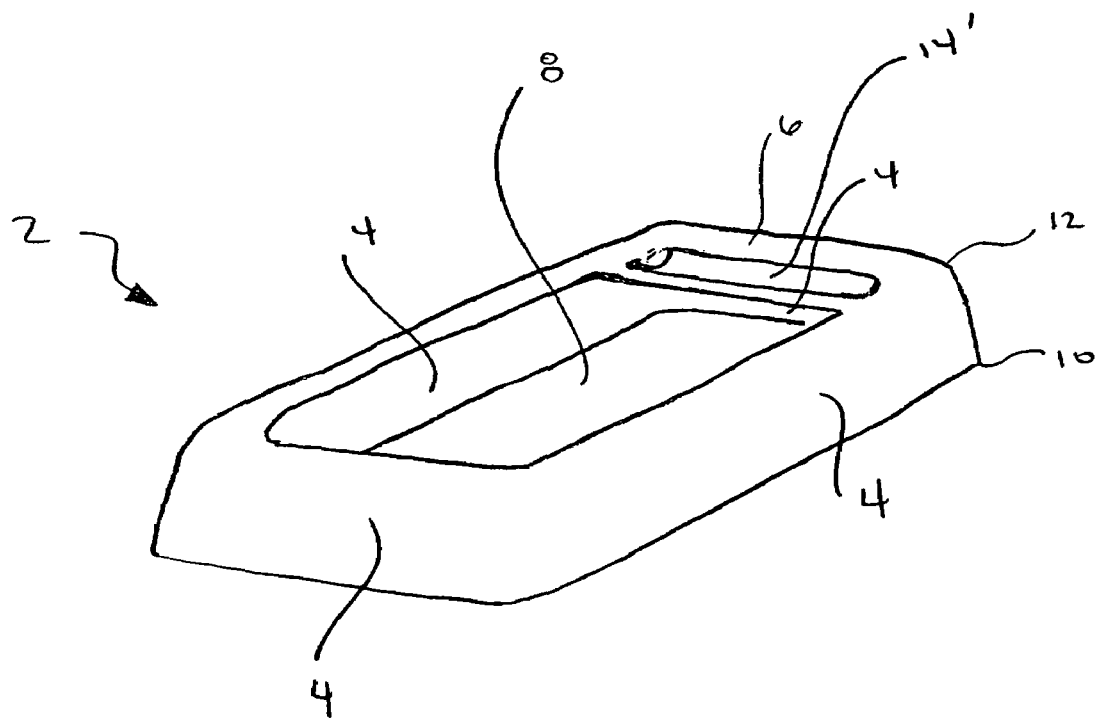
FIG. 8 is a perspective view of an alternative embodiment of the serving container cover of the present invention, with a rest for supporting one or more serving utensils located on the top wall adjacent the opening.
Figure 9:
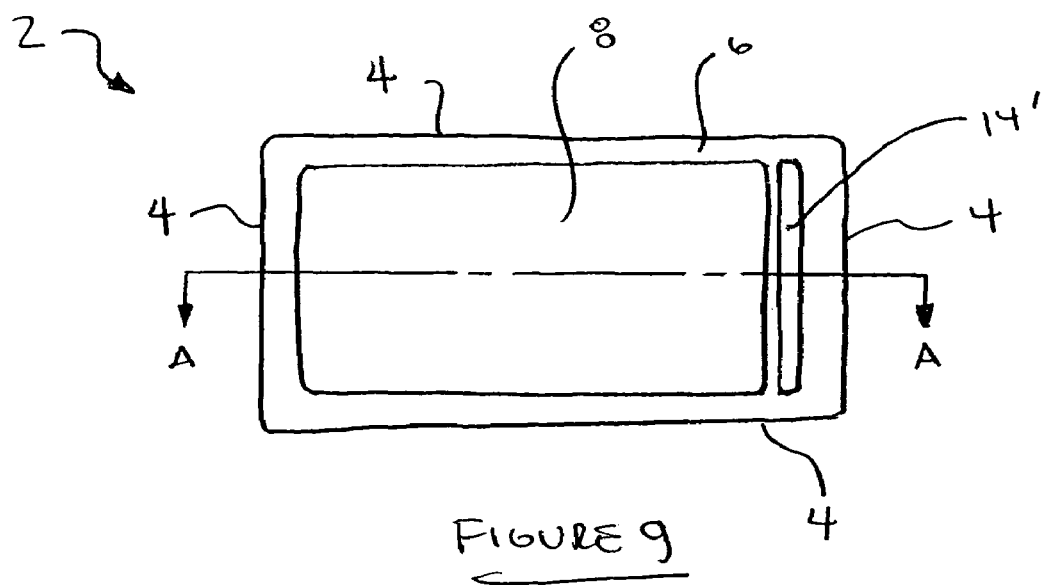
FIG. 9 is a plan view of the serving container cover of FIG. 8.
Figure 10:
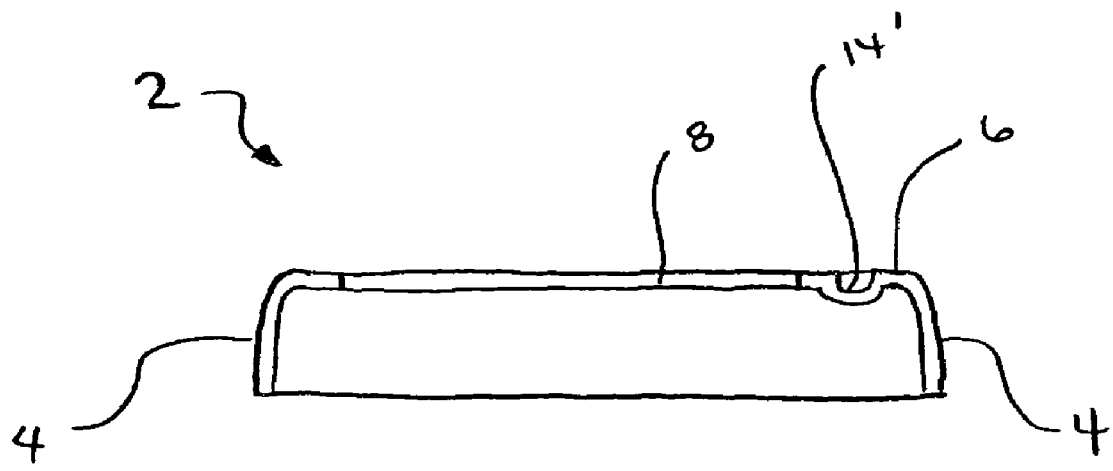
FIG. 10 is a cross sectional elevation of the serving container cover of FIG. 8, through line A-A of FIG. 9.
Figure 11:
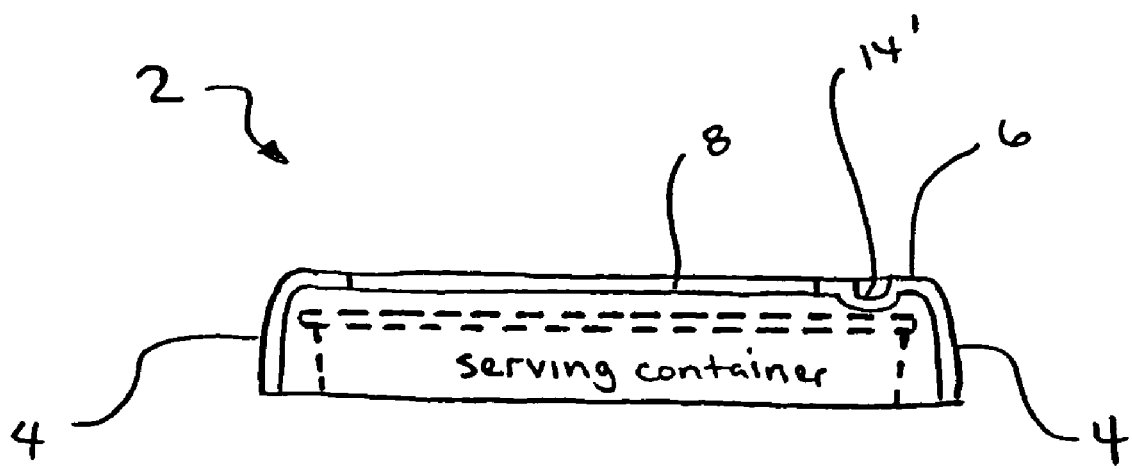
FIG. 11 is a cross sectional elevation of the serving container cover of FIG. 8, through line A-A of FIG. 9, showing the serving container to be covered in phantom.

As shown in FIGS. 1-3, the present invention comprises a serving container cover 2 having four side walls 4, a top wall 6 and an opening 8 in the top wall 6. Of course, the serving container cover 2 can be formed in a circular or oval configuration such that there is only one side wall, however, to minimize space such a configuration is generally contemplated for covering a round or oval serving container.

The length and width of the serving tray cover 2 need only fit over the serving container being covered. Preferably, there would be a minimum of space between the serving container and the cover 2 to minimize wasted space on a serving table. The opening 8 in the top wall 6 of the serving container cover 2 is of sufficient size to conceal the edge of the serving container but not so small as to impair access to the edges of the serving container.

The height of the serving container cover 2 is not of particular significance to the invention, wherein it should only be high enough to cover a serving container. Alternative embodiments are contemplated with different heights so that one cover can fit over a serving container place directly on a surface while another cover will fit over a serving container placed over a serving tray placed on a stand, as commonly used in catering.

In the preferred embodiment shown in the accompanying drawings, the serving container cover 2 has a larger base portion 10 and a smaller top portion 12, so that the serving container covers can nest in a stacked arrangement. This configuration will permit storage space to be minimized for multiple serving container covers 2.

The serving tray cover 2 can be formed of any suitable material, including porcelain, earthenware, ceramics, laminated glass, metal, paper, cardboard, polymers, plastics or the like. Most preferred are polymers and plastic for lower costs, ease of manufacture, durability and disposability.

When using polymers or plastics, the serving container cover 2 can be formed in a variety of ways, including foaming, injection molding, vacuum forming, etc. When a disposable polymer or plastic material is used, vacuum forming is considered to be a preferred method of production.

In this regard, the thickness of the material used should be sufficient to give the cover 2 enough body to maintain its shape when used in its normal environment. However, it is preferred that when a disposable cover 2 is contemplated, the minimum amount of material is used to avoid unnecessary waste.

In a preferred embodiment, shown in FIGS. 4-11, the cover includes one or more rests 14 for supporting serving utensils. The rest 14 shown in FIGS. 4-7 is a single shelf with an upturned lip extending from the side wall 4 of the serving container cover.

Alternatively, the rest 14' of FIGS. 8-11 is preferably a recessed area on or below the top wall 6 adjacent the opening 8. The rest 14' of FIGS. 8-11 can be a moderate recession in the top wall 6 or can be a full recession that extends to the bottom of the serving container cover 2 adjacent the opening 8 and the serving container being covered.

Of course, it is understood that the rest can comprise one or more posts or similar projections, indentations, etc. for resting one or more serving utensils. Moreover, the rest can be located on the side wall 4, as shown in FIGS. 4-7, from the top wall 6 adjacent the opening 8, as shown in FIGS. 8-11, or in any other suitable location.

As with the embodiment of FIGS. 1-3, it is contemplated that the alternative embodiments of FIGS. 4-11 can also be stacked to minimize storage space.

It is contemplated that the serving container cover 2, including at least a portion of the side walls 4 and/or top wall 6, be adapted to carry a decorative graphic, such as a decorative color, design and/or wording. For example, the decorative graphic on the serving container cover 2 can merely be one or more colors to compliment a table or occasion, i.e., red or green for Christmas. Similarly, the serving container cover 2 can have a decorative graphic including not only one or more colors as a background, but also printed depictions of items or designs. For example, the decorative graphic can include cakes, balloons and/or flowers displayed on the serving container cover 2. This could be combined with words to the effect of "Happy Birthday", as shown in FIGS. 1 and 2.

Of course, variations, modifications, or deviations to the above description may be or become known to persons skilled in the art in light of this description. All such variations, modifications, deviations and the like are intended to be part of the present invention, limited only by the following claims.

I claim:

1. A decorative serving container cover for covering a serving container, said container cover comprising one or more side walls, a top wall having an opening through the top wall for access to an interior of the decorative serving container cover, said opening being slightly smaller than the size of the top wall, and one or more rests one of extending from and extending within one of the side walls and the top wall and positionally fixed relative to the opening for retaining one or more serving utensils, wherein the decorative serving container cover has an entirely open bottom, is sized so that there will be a space between the decorative serving container cover and the serving container being covered and lacks means for attachment to the serving container being covered.

2. The decorative serving container cover of claim 1 wherein the one or more side walls have a base portion and a top portion, the top portion having a smaller area than the base portion such that the serving container cover can be nested on similar serving container covers for stacking.

3. The decorative serving container cover of claim 1 wherein the serving container cover is made of a material taken from the group consisting of porcelain, earthenware, ceramics, laminated glass, metal, paper, cardboard, polymers and plastics.

4. The decorative serving container cover of claim 3 wherein the serving container cover is formed of a polymer.

5. The decorative serving container cover of claim 4 wherein the serving container cover is formed by a process taken from the group consisting of foaming, injection molding and vacuum forming.

6. The decorative serving container cover of claim 1 wherein at least one of the one or more rests comprises a shelf with an upturned lip.

7. The decorative serving container cover of claim 1 wherein at least one of the one or more rests is formed on at least one of the one or more side walls.

8. The decorative serving container cover of claim 1 wherein at least one of the one or more rests is formed on the top wall.

9. The decorative serving container cover of claim 8 wherein at least one of the one or more rests is on the top wall adjacent the area of the opening.

10. The decorative serving container cover of claim 1 further comprising a decorative graphic on at least a portion of the one or more side walls and the top wall.

11. The decorative serving container cover of claim 10 wherein the decorative graphic is formed in the material of the serving container cover.

12. The decorative serving container cover of claim 10 wherein the decorative graphic is applied to the surface of the serving container cover.

13. The decorative serving container cover of claim 1 wherein there is no closure for closing the opening.

14. The decorative serving container cover of claim 1 wherein the one or more rests are taken from the group consisting of a shelf with an upturned lip, a recession, an indentation, one or more posts and one or more projections.

* * * * *